Figure 1:
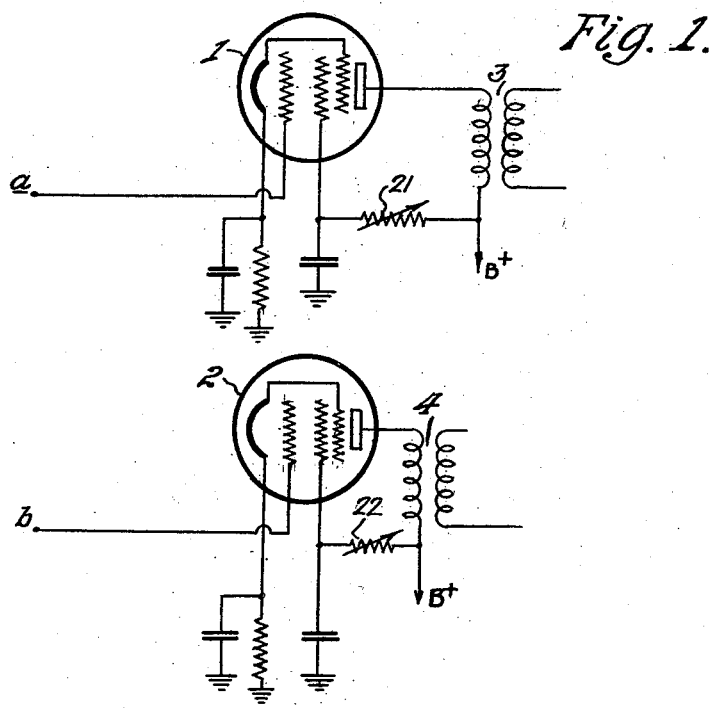

July 5, 1949.  L. GABRILOVITCH  2,475,020
METHOD FOR AUGMENTING SMALL PHASE DIFFERENCES
Filed Nov. 23, 1943

INVENTOR.
Leonide Gabrilovitch,
By Barr, Borden & Fox
Attorneys.

Patented July 5, 1949

2,475,020

UNITED STATES PATENT OFFICE 2,475,020

METHOD FOR AUGMENTING SMALL PHASE DIFFERENCES

Leonide Gabrilovitch, New York, N. Y.

Application November 23, 1943, Serial No. 511,426

3 Claims. (Cl. 178—44)

The present invention relates to electric signalling indicating and measuring and more particularly to the problem of increasing differences between the phases of two or several waves or currents having the same frequencies.

Phase differences are used in practice for many purposes; for instance, for measuring distances with the help of reflected waves as used in radars, special altimeters, or devices for locating planes, etc.

In most of these cases, the phase shifts produced by reflection, or by other employed factors, have extremely small values, so that the measuring becomes very difficult, and only a very low accuracy can be obtained.

The main object of the present invention is to provide a method and apparatus enabling the augmentation of small phase differences, and more particularly, a more or less linear augmentation of said differences.

It is another object of the invention to increase very small phase differences existing between two or more waves of similar frequencies.

It is a still further object to provide an apparatus and method for balancing a wave of one frequency and phase against a wave of the same frequency but slightly different phase to secure an output wave of the same frequency but still different phase from either of the balancing waves.

It is another object of the invention to increase very small phase shifts by balancing the initial wave of one phase against a transformed wave of slightly shifted phase to secure an output of augmented phase shift of the transformed wave.

Another object of the invention is to increase very small phase shifts by balancing the initial wave, or plurality of waves, against a transformed wave, or transformed plurality of waves, wherein the phase has or the phases have been shifted by a comparatively very small angle or by comparatively very small angles, respectively.

Still further objects of the invention include the provision of means and methods; for converting an oscillation of one frequency and phase to another predetermined frequency and phase, whether the oscillation is modulated or unmodulated; for transforming an aggregate of three or more waves of respectively relatively close frequencies into an aggregate of waves all having the same frequency but respectively different phases; for utilizing a function of a difference in frequency between waves to govern the difference of phase shift in transforming a wave of one frequency to another; for selectively changing the shift of phase between waves of small differences to a predetermined value or selected value in a predetermined range; and for uniformly increasing the phase shifts produced by a tuned oscillating circuit through which is conveyed a plurality of modified waves having different carrier frequencies.

In carrying out the invention in one more or less fundamental, but purely illustrative form, the initial wave (or plurality of waves), and the product in which said wave or plurality is transformed by a certain phenomenon producing a very slight shifting of the initial phase, are made to balance each other, after appropriate adjustment of their levels. As will be explained below, this balancing, combined with a determined adjustment of the levels, causes an augmentation of the initial phase-shifts, the order of magnitude of this augmentation depending on and comprising a function of the relative proportioning of the two levels.

Figure 2:
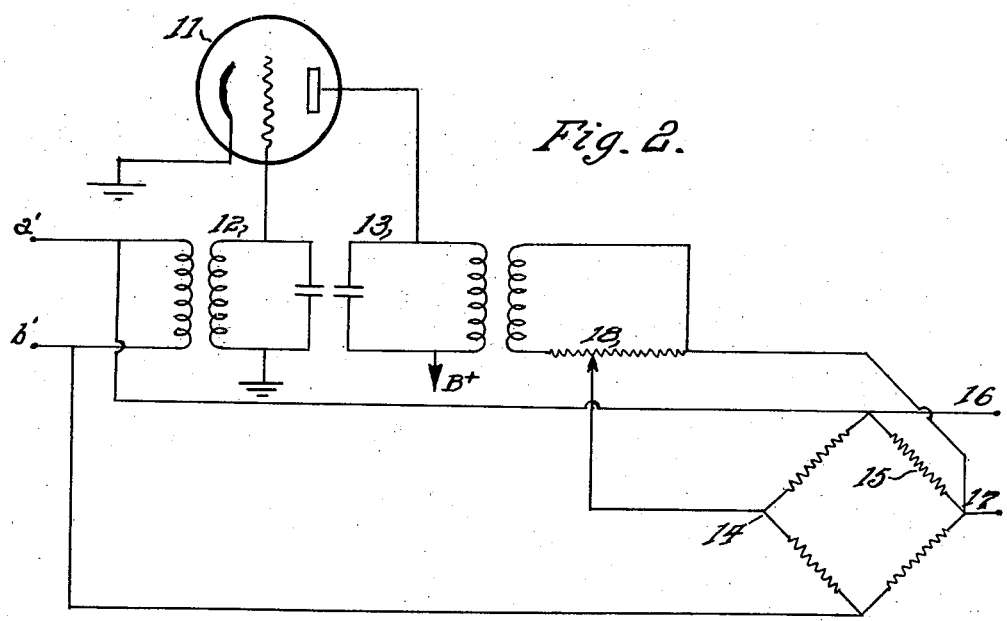

Other objects and advantages of the invention will appear and be better understood from the following description, illustrated by the accompanying drawing wherein Fig. 1 represents, in a merely illustrative way, a schematic diagram of an arrangement enabling the augmentation of very small phase shifts, and Fig. 2 represents a schematic diagram of a circuit designed to increase the phase shifts produced by the action of a tuned circuit on an incoming aggregate of waves having different frequencies.

As briefly indicated above, the method of increasing small phase shifts, characterizing the present invention, consists in a subtractive superposing of the initial incoming aggregate of waves, and the product obtained by submitting said aggregate to a dephasing operation, said superposing being effected after the levels or relative levels of both aggregates have been adjusted in an appropriate way.

The following simple example illustrates the mechanism of the thus defined method:

Let it be assumed that $A \sin \omega t$ is the expression of one of the incoming modulated waves, and that the phase of this wave is shifted by the dephasing circuit by the angle $\psi$, so that the initial wave is transformed into the wave $$A \sin (\omega t + \phi)$$

Now, let it be assumed that a difference of said two waves is formed by superposing them in opposite directions, the levels having been adjusted, e. g. in such a way that the difference in question has the following form:

$$A \sin (\omega t + \phi) - \frac{9}{10} A \sin \omega t$$

It can be readily seen that this difference is equal to—

$$A\left(\cos \phi - \frac{9}{10}\right) \sin \omega t + A \sin \phi \cos \omega t = g_0 \sin \left[\omega t + \arctan \frac{\sin \phi}{\cos \phi - \frac{9}{10}}\right]$$

in which expression $$g_0 = \sqrt{\left(\cos \phi - \frac{9}{10}\right)^2 + \sin^2 \phi}$$

It can be easily realized that if the angle $\phi$ is small, the angle $$\arctan \frac{\sin \phi}{\cos \phi - \frac{9}{10}}$$

is considerably greater than $\phi$. In fact, let it be assumed that $\phi = 2°$. When measured in radians, its value is approximately equal to 0.0349. On the other hand, $$\arctan \frac{\sin 2°}{\cos 2° - \frac{9}{10}} \cong 0.35$$

which value corresponds to an angle of $> 9° 30'$

This example shows that by using the proposed method, one can easily and in an extremely simple way, transform a small phase-shift (e. g. of 2°) into a much greater one (e. g. of 19°). It can be figured out in the same way that a phase-shift of 1° can be transformed into a phase-shift of 10°, a phase-shift of 5° into a phase-shift of 41°, etc.

The proportion in which a given phase-shift is increased by using the just described method, is controlled by adjusting the levels of the initial incoming aggregate and the output of the "dephasing circuit." If, for example, these levels are adjusted in such a way that the analytical expression of the two superposed aggregates has the following form:

$$A \sin (\omega t + \phi) - 0.95 A \sin \omega t$$

a phase-shift of 2° will be transformed into a phase-shift of approximately 35°, a phase-shift of 5° into a phase-shift of approximately 60°, etc.

Fig. 1 represents diagrammatically, in a merely illustrative way, one of the possible embodiments of an arrangement enabling the augmentation of very small phase shifts conceived and designed in accordance with the present invention. In this figure, terminals $a$ and $b$ are the input terminals acted upon respectively by the initial incoming wave or plurality of waves and by the product into which said wave or plurality of waves is transformed by the employed dephasing operation. There are provided two amplifiers 1 and 2, the gains of which can be varied at will, e. g. by adjusting their grid resistances. These amplifiers can also be constituted by pentodes or heptodes with variable mutual conductance (not shown). They are designed to adjust in an appropriate way the levels of the initial incoming aggregate and of the product of its dephasing. It is evident that any other method of level adjustment can be employed without transgressing the limits of the present invention, as the specific illustration given above, as well as many other types of gain control are well known in the art. The outputs of the tubes 1 and 2 are conveyed through the transformers 3 and 4 respectively to the two diagonals of the bridge 5, so that they are superposed in a subtractive way in one of the arms of said bridge, for instance, in the arm 9 inserted between the output terminals $c$ and $d$.

It will be clear that steps must be taken in order to maintain the appropriate phase relationship and avoid any incidental attenuation in the thus established two channels.

Fig. 2 represents a schematic diagram of a circuit designed to increase the phase shifts produced by the action of a tuned circuit on an incoming aggregate of waves having different frequencies. In this diagram, an amplifier 11 is acted upon by the incoming plurality of waves having different carrier frequencies. Two tuned circuits represented by characters 12 and 13 are inserted respectively in the grid and in the plate of said amplifier 11. These two tuned circuits obviously can be considered as a single tuned circuit as far as their dephasing action on a wave or plurality of waves is concerned. It is assumed that the circuits in question are tuned to the carrier frequency of one of the incoming waves. Under these circumstances, any wave having a different carrier frequency from that to which the employed circuits are tuned will undergo, during its passage through said circuits, a certain dephasing whose value will be a function of the difference between its carrier frequency and that to which the above mentioned circuits are tuned.

The dephasing effects will have a practical linear character as long as the angles by which the incoming waves are dephased are comparatively very small. In order to increase the thus obtained phase differences in a practically uniform and linear way, an arrangement is employed designed in accordance with what has been explained above.

The output and the input of the amplifier 11 after relative adjustment of the levels thereof by variable resistance 18, are conveyed to a balancing device 14, arranged in the form of a bridge. The input of amplifier 11 is applied to one of the diagonals of the bridge. While the input is acting on the second diagonal, the extremities of the arm 15 of the bridge, wherein the input and the output are superposed in an opposite sense, are connected with the output terminals 16 and 17 of the represented arrangement.

The wide scope of utility of the invention, as well as the fact that changes can be made in the apparatus disclosed, without departing from the spirit of the invention as defined in the appended claims, will be evident.

Having thus described my invention, I claim:

1. The method of augmenting small phase differences between the phases of two waves of the same frequency, which comprises relatively adjusting the levels of the two waves, in such a way that the ratio of amplitude of one of said waves to the difference of amplitude of both waves is approximately equal to the number defining the proportion in which it is desired to increase the initial phase difference, superposing one level-adjusted wave subtractively upon the other adjusted wave to furnish an output with an augmented difference of phase.

2. The method of increasing very small phase differences which comprises adjusting the amplitude of two initial waves in such a way that the ratio of the amplitude of one of these waves to the difference in amplitude of both waves is equal to the number defining the proportion in which it is desired to increase the initial small phase difference between the waves, superposing in a subtractive way the said two waves after having adjusted the amplitudes thereof, so that the original small phase difference is increased in predetermined proportion in the output compared to one of said initial waves.

3. The method of establishing wide differences between phases of waves of the same frequencies but small phase differences, which comprises adjusting the level of the wave of the first phase, adjusting the level of the wave of the slightly different phase, both adjustments consisting in adjusting the waves in such a way that the ratio between one of the waves to the difference of both waves is equal to the number defining the proportion in which it is desired to increase the initial small phase difference, then superposing in a subtractive way the level-adjusted waves to obtain an output of predeterminedly shifted phase relative to the phase of the wave of the first phase.

LEONIDE GABRILOVITCH.

REFERENCES CITED

The following references are of record in the file of this patent:

UNITED STATES PATENTS

| Number | Name | Date |
| --- | --- | --- |
| 1,969,537 | Alexanderson | Aug. 7, 1934 |
| 2,147,810 | Alford | Feb. 21, 1939 |
| 2,254,734 | Falloon et al. | Sept. 2, 1941 |
| 2,332,253 | Peterson | Oct. 19, 1943 |
| 2,349,261 | Ginzton | May 23, 1944 |